3,274,770
METHOD AND SYSTEM FOR SUPPLYING THRUST TO A SPACE VEHICLE
Joseph C. Carter, Elmhurst, and Max B. Rodin, Park Forest, Ill., assignors to the United States of America as represented by the United States Atomic Energy Commission
Filed Feb. 9, 1966, Ser. No. 526,667
3 Claims. (Cl. 60—203)

The invention described herein was made in the course of, or under, a contract with the United States Atomic Energy Commission.

This invention relates to nuclear-rocket propulsion of space vehicles. In more detail, the invention relates to a method of supplying thrust to a space vehicle. The invention also relates to a nuclear-rocket propulsion system.

Space travel is now a national objective rather than a dream of visionaries. Long-range plans call for the use of a chemical propulsion system to lift a rocket into orbit and then for a nuclear-rocket propulsion system to provide the thrust necessary for a long and complex space mission.

It is accordingly an object of the present invention to develop a method of supplying thrust to a space vehicle.

It is another object of the present invention to develop a nuclear propulsion system for use in space.

These and other objects of the present invention are attained by employing lithium hydride enriched in the lithium-6 isotope as propellant for a space vehicle and bombarding the lithium hydride with leakage neutrons from a nuclear reactor just prior to its discharge from the vehicle through a nozzle, whereby a part of the lithium-6 is converted into kinetic energy in accordance with the equation $Li^6 + n = He^4 + H^3 + 4.8$ mev.

Figure 1:
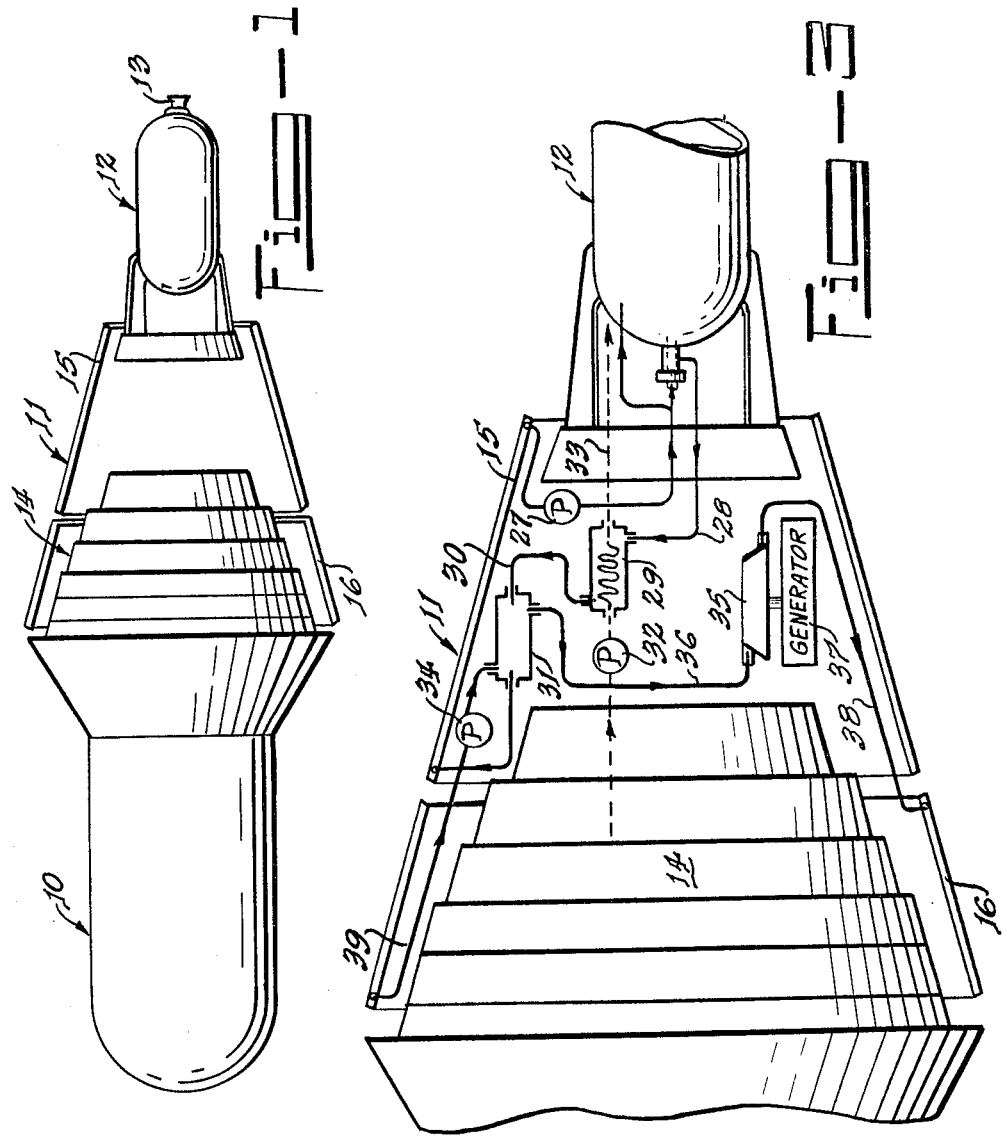
Figure 2:
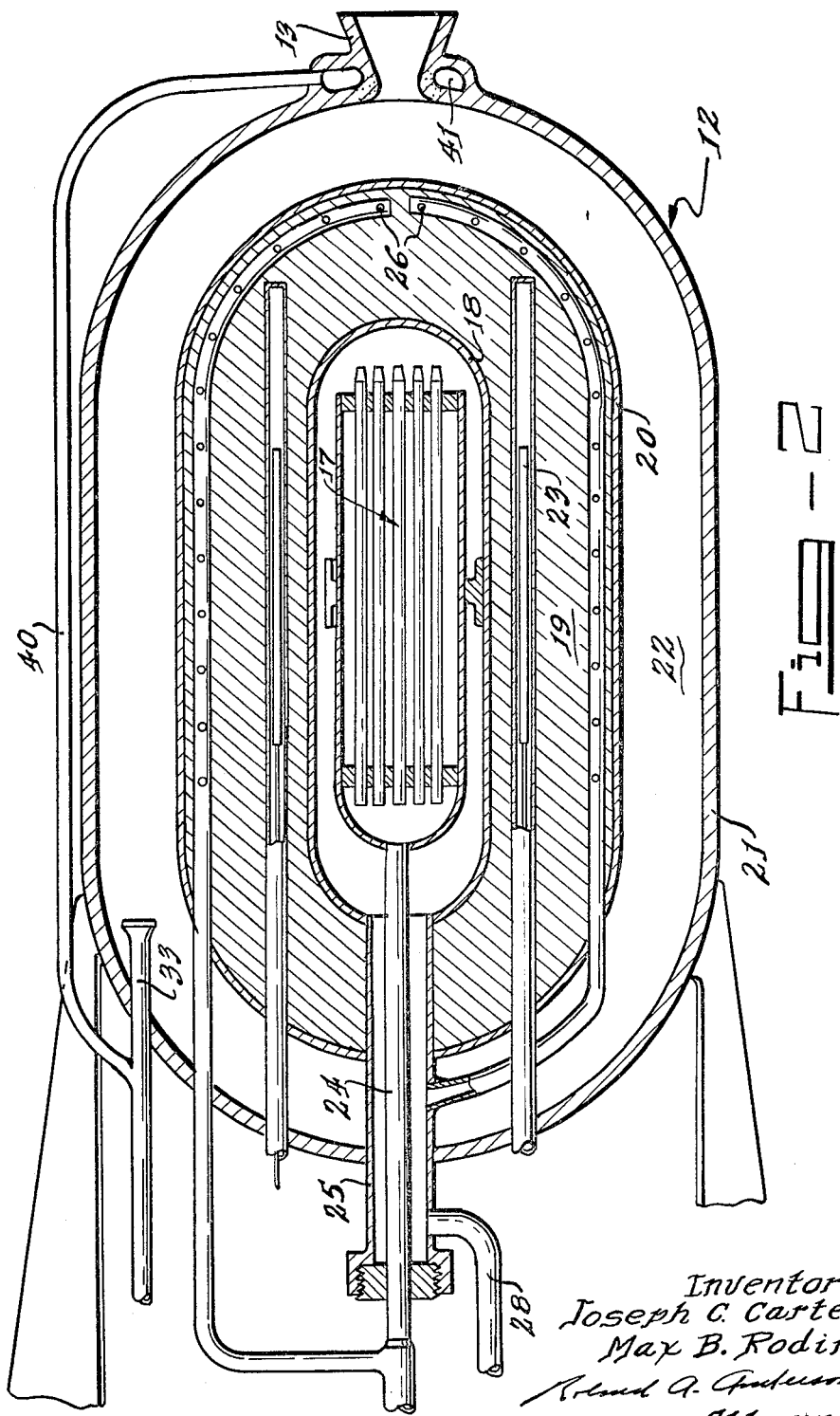

The invention will next be described in connection with the accompanying drawing wherein:

FIG. 1 is a schematic view of a space vehicle incorporating the present invention, FIG. 2 is a longitudinal section taken through the rear or reactor section of the space vehicle, and FIG. 3 is a longitudinal section taken through the front or machinery section of the space vehicle.

As shown in FIG. 1, the space vehicle includes a capsule or pay-load section 10, a machinery section 11, and a reactor section 12. Also shown are a propulsion nozzle 13 and a biological shield 14, a primary coolant radiator 15 and a secondary coolant radiator 16 forming part of machinery section 11.

Referring next to FIG. 2, reactor section 12 includes a reactor core 17 surrounded by an inner pressure vessel 18, a beryllium reflector 19 surrounding the core and enclosed within a reflector vessel 20, and an outer pressure vessel 21 spaced from the reflector vessel 20. Vessels 20 and 21 constitute the walls of an irradiation chamber 22. Control rods 23 are mounted in reflector 19 in conventional fashion.

Core 17 is 7 centimeters in diameter and 140 centimeters long; beryllium reflector 19 is 7½ centimeters in inside diameter, 37 centimeters in outer diameter and sufficiently long to completely surround the core; and irradiation chamber 22 is 20 centimeters wide.

Primary coolant, which may, for example, be molten lithium, enters reactor core 17 through inlet pipe 24 and, after passing through the core, reverses its direction of flow to return to outlet pipe 25 around the outside of the core. A sidestream of coolant from inlet pipe 24 traverses coolant ducts 26 to cool reflector vessel 20.

Front or machinery section 11 will next be described with particular reference to FIG. 3. Coolant is pumped through the core by pump 27. After traversing the core the coolant passes through line 28 to heat exchanger 29 where it yields up its heat to molten lithium hydride. From heat exchanger 29 the coolant passes through line 30 to boiler 31 and thence to radiator 15. From radiator 15 the coolant is returned to the core by pump 27.

Molten lithium hydride which has been heated in a preheater (not shown) is pumped through heat exchanger 29 by pump 32 and sprayed into irradiation chamber 22 through line 33. The molten lithium hydride is heated to a temperature above the dissociation temperature thereof in irradiation chamber 22 by bombardment with thermal neutrons from reactor core 17. The resulting gas—which will contain all or most of the seven components, Li, $H^+$, $H_2$, $Li_2$, $Li^+$, $e^-$, and LiH—is expanded through nozzle 13 to provide thrust for the vehicle. Meanwhile a secondary coolant, which may, for example, be sodium, is pumped into boiler 31 by pump 34. The vaporized sodium is conducted to turbine 35 by line 36, which turbine operates generator 37. Generator 37 provides auxiliary power for preheating the lithium hydride and for operating the space vehicle. Spent secondary coolant from turbine 35 is conducted to radiator 16 by line 38 and is returned to pump 34 by way of line 39.

A sidestream of molten lithium hydride is conducted from line 33 through pipe 40 to nozzle cooling ring 41. The relatively cool lithium hydride passes through small pores in the nozzle throat to remove heat from the propellant gas. This by-pass gas maintains the nozzle throat at a tolerable temperature.

Thus, the lithium hydride propellant is heated in several stages. Since lithium hydride melts at 680° C., it is first heated to that temperature so that it can be pumped through heat exchangers 29. After the required number of preheating stages, the molten lithium hydride is heated to 1000° C. in heat exchanger 29 and the molten lithium hydride is sprayed into irradiation chamber 22 at about that temperature. In irradiation chamber 22 the molten lithium hydride is heated to a temperature of 7200° C. under a pressure of 100 atmospheres as a result of its bombardment with thermal neutrons and the vaporized propellant is expanded through nozzle 13 to provide thrust for the vehicle.

The reactor coolant enters the reactor at 950° C. and leaves the reactor at 1100° C., yielding up a part of this heat to the propellant in heat exchanger 29, a part of this heat to the secondary coolant in boiler 31 and the excess heat in radiator 15.

Lithium-6 hydride is specified as propellant because lithium-6 has a very high cross section for thermal neutrons and a relatively low molecular weight. Because of its low molecular weight, it is satisfactory as a propellant and it is required because of its nuclear properties. Although somewhat expensive, the cost of the material is not prohibitive even though it is discarded after passing through the rocket. The thermal neutron cross section of lithium-6 is 950 barns and there are about 1.18 neutron captures per fission. Since the thermal neutron cross section is higher than that at other energies, moderator 19 is provided to ensure that essentially all neutrons reaching the irradiation chamber are thermal neutrons. As moderator, beryllium is specified, with beryllium oxide as a good alternative and tantalum beryllide as a possibility.

A ceramic material is used as fuel because of the high temperature of operation of the reactor and plutonium dioxide is specified for this purpose to maximize the yield of excess neutrons. As a structural material, niobium–1% zirconium is specified, with tungsten being an alternative capable of resisting somewhat higher temperatures.

It is, of course, apparent that the walls of irradiation chamber 22 cannot tolerate a temperature of 7200° C. However, the walls do not "see" such a high temperature because there is a steep temperature gradient from the center of the chamber to the walls, the temperature of the gas dropping off exponentially as the wall is approached. Thus the temperature of the gas in actual contact with the walls is lower than the melting point of the wall material. This is partially explained by the fact that the walls are cooled—wall 21 by radiation and wall 20 by cooling coils 26. Also, the gas is opaque to radiation under the temperature and pressure obtaining. Thus, the radiation from the gas at the center of the chamber is absorbed by the gas before it strikes the wall and it is only radiation from gas at a much lower temperature at the periphery of the chamber which strikes the walls.

The primary advantage of the present invention resides in the fact that the reactor core is operated at a much lower temperature than the temperature of the propellant. Thus, the reactor per se requires only conventional materials of construction and techniques of operation.

It will be appreciated that some of the advantages of the present invention can be attained at temperatures of operation very much lower than those specified heretofore. For example, the molten lithium hydride could be sprayed into reaction chamber 22 at just above the melting point and then heated to slightly above the vaporization temperature or about 1500° C. by the nuclear reaction. Ejection of this gas at about 1500° C. would provide a useful amount of thrust for the space vehicle.

It will be understood that the invention is not to be limited to the details given herein but that it may be modified within the scope of the appended claims.

What is claimed is:

1. A nuclear propulsion system for use in space comprising a solid-core liquid-metal-cooled nuclear reactor, a beryllium reflector surrounding the reactor, means establishing an irradiation zone surrounding the reflector, means for introducing molten lithium hydride enriched in lithium-6 into said irradiation zone, and means for ejecting the resulting gas containing products of the reaction of neutrons and lithium-6 from the irradiation zone to provide thrust.

2. A method of supplying thrust to a space vehicle comprising establishing and maintaining a chain reaction in a solid-core liquid-metal-cooled nuclear reactor, moderating the fast neutrons escaping therefrom, passing molten lithium hydride enriched in lithium-6 adjacent to said reactor, whereby said moderated neutrons interact with the lithium-6 in accordance with the equation $Li^6 + n \rightarrow He^4 + H^3 + 4.8$ mev., the resulting energy release serving to heat the lithium hydride above its vaporization temperatude, and ejecting the resulting gas from the space vehicle to propel the space vehicle.

3. The method according to claim 2 wherein the lithium-6 hydride is preheated by heat exchange with the liquid-metal reactor coolant.

No references cited.

REUBEN EPSTEIN, *Primary Examiner.*